(12) United States Patent
Servaes et al.

(10) Patent No.: US 6,985,578 B2
(45) Date of Patent: Jan. 10, 2006

(54) LOW VOLTAGE BROADBAND LINE DRIVER

(75) Inventors: Jan Louis Josephina Servaes, Waregem (BE); Wim André Paula De Wilde, Antwerp (BE)

(73) Assignee: Alcatel, Paris (FR)

( * ) Notice: Subject to any disclaimer, the term of this patent is extended or adjusted under 35 U.S.C. 154(b) by 730 days.

(21) Appl. No.: 09/910,037

(22) Filed: Jul. 23, 2001

(65) Prior Publication Data

US 2002/0034294 A1 Mar. 21, 2002

(30) Foreign Application Priority Data

Jul. 24, 2000 (EP) .................................. 00402123

(51) Int. Cl.
*H04M 19/00* (2006.01)
(52) U.S. Cl. .................. 379/399.01; 379/398; 379/394
(58) Field of Classification Search .......... 379/399.01, 379/402–404, 398, 414, 93.01, 93.05, 93.06, 379/394; 330/102, 105, 195–197, 276, 293
See application file for complete search history.

(56) References Cited

U.S. PATENT DOCUMENTS 5,038,375 A * 8/1991 Sinberg ..................... 379/398
6,198,818 B1 * 3/2001 Bingel ................... 379/399.01

FOREIGN PATENT DOCUMENTS

EP 0 901 221 A1 3/1999
WO WO 99/39433 8/1999

OTHER PUBLICATIONS

B. Schweber, "Analog Front Ends Bridge the XDSL-to-Real-World Chasm", EDN Electrical Design News, Massachusetts, US, vol. 44, No. 7, Apr. 1, 1999, pp. 48, 50, 52, 54, 56, 58, 60, 62, 64, XP000899059.
E. Nash, "Line-Driver Design for Broadband Communications Applications", Electronic Design, us, Cleveland, Ohio, vol., 45, No. 27, Dec. 1, 1997, pp. 81-82, 84, 86, 88 , XP000755760.
M. Steffes et al, Optimizing Performance in an XDSL Line Driver, Electronic Design, Cleveland, Ohio, US, vol., 47, No. 8, Apr. 19, 1999, pp. 44, 46, 48, 52, 54, 56, 58 XP000893613.
E. Nash, Saving Dynamic Power in HDSL Line Driving Applications, Electronic Design, US Cleveland Ohio, vol., 45, No. 12, Jun. 9, 1997, p. 88, 90, 92, XP000731500.

* cited by examiner

*Primary Examiner*—Sinh Tran
*Assistant Examiner*—Walter F Briney, III
(74) *Attorney, Agent, or Firm*—Sughrue Mion, PLLC

(57) ABSTRACT

The present invention relates to broadband line drivers, comprising a cascade connection of an operational amplifier (A) and a transformer (T), which can be integrated on chip. This is obtained by putting the transformer (T) in a feedback loop between the output and the input of the operational amplifier (A).

6 Claims, 2 Drawing Sheets

LOW VOLTAGE BROADBAND LINE DRIVER

TECHNICAL FIELD OF THE INVENTION

The present invention relates to broadband line drivers, such as an ADSL (Asymmetric Digital Subscriber Line) line driver or a VDSL (Very High Speed Digital Subscriber Line) line driver which can be integrated on chip.

BACKGROUND OF THE INVENTION

Broadband line drivers as ADSL (Asymmetric Digital Subscriber Line) line drivers, VDSL (Very High Speed Digital Subscriber Line) line drivers or others, generally called xDSL line drivers (where "x" represents the type of technology), are known to a person skilled in the art, e.g. from Bill Schweber, "*Analog front ends bridge the xDSL-to-real-world chasm*", *EDN* Apr. 1, 1999 p. 48–64 (FIG. 3), from E. Nash, "*Line-driver design for broadband communications applications*", *Electronic Design*, Dec. 1, 1997, p. 81–94, and from M. Steffes, "*Optimizing performance in an xDSL line driver*", *Electronic Design*, Apr. 19, 1999, Vol. 47 No. 8, p. 44–58.

Such broadband line drivers typically comprise a cascade connection of an operational amplifier and a transformer with a rather low (e.g. 1:2) transformation ratio for galvanically isolating the amplifier from the line. The transformation ratio has to remain low, otherwise linearity and frequency response are limited because a high turns ratio in transformers is more prone to distortion and limits the bandwidth. Moreover, in many front ends, a high step up for the transmitted signal (=the signal going out on the line) means a high step down for the received signal, which affects the signal to noise ratio (SNR).

Line drivers are usually back-terminated, because signals traversing an unterminated cable are reflected and these reflections can severely affect the primary signal. Conventionally, the termination resistance cannot be implemented with sufficient precision if a high transformation ratio is used. Indeed, to correctly terminate the line, it is necessary to set the output impedance of the amplifier to be equal to the impedance of the line being driven. If the transformation ratio is rather high, e.g. 1:5, then the impedance reflected from the line is low, equal to the line characteristic impedance for the example given divided by 25. The low resistor values needed for the line impedance matching circuit in that case cannot be realised with sufficient resolution.

The immediate effect of back-termination is that the signal from the amplifier is halved before it is applied to the line. This doubles the power that the amplifier must deliver.

The maximum required line voltage depends on the modulation scheme used and on the line impedance and is for a low transformation ratio (1:1 or 1:2) generally between 15 and 30 V. Therefore, the operational amplifier has to generate a high voltage output signal, and thus a high power supply voltage (generally between 12 and 15 V) is required for the operational amplifier.

An active back-terminated broadband line driver is descried in EP-0 901 221. The active back-termination enables to substantially decrease the power consumption of the line driver, and is widely used in industry nowadays.

However, as explained before, high power supply voltages are still needed, and a consequence thereof is that integration of the line driver on chip is not possible or at least difficult to realise. The line driver therefore, at present, is not integrated in any of the chips.

SUMMARY OF THE INVENTION

It is an object of the present invention to provide a broadband line driver and a method of operating the same which allows integration on a chip.

It is another object of the present invention to reduce the supply voltage of the amplifier of a broadband line driver.

It is yet another object of the present invention to improve non-linearities and poor frequency response of a transformer used in a broadband line driver.

These objectives may be severally or individually be accomplished by a line driver, comprising an operational amplifier and an output transformer, the transformer being in a feedback loop between the output and the input of the operational amplifier. The driver can have a low power consumption and a low driving voltage compared with conventional designs. The non-linearities and poor frequency response of the transformer are compensated for by the feedback loop, and hence a transformer with a rather high transformation ratio (e.g. 1:5) can be used.

The present invention also provides a method of operating a broadband line driver comprising an amplifying device, comprising the steps of:

transforming the output voltage of the amplifying device to a higher value;

feeding back a signal from the transformed output voltage to an input of the amplifying device.

Other characteristics and advantages of the invention may be seen from the following description of a specific embodiment of a broadband line driver according to the invention; this description is given for the sake of example only, without limiting the scope of the invention. The references quoted below refer to the attached drawings.

In the different figures, the same references refer to the same or analogous elements.

DESCRIPTION OF THE ILLUSTRATIVE EMBODIMENTS

Figure 1:
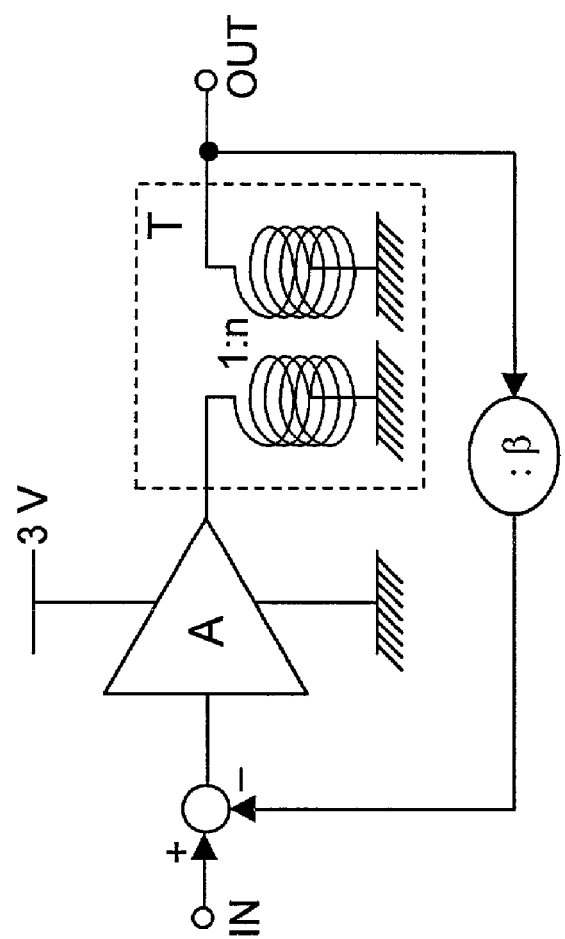
FIG. 1 is a schematic circuit diagram illustrating a broadband line driver with a transformer in the feedback loop in accordance with an embodiment of the present invention.

A basic circuit in accordance with an embodiment of the present invention is shown in FIG. 1 which represents, schematically, a broadband line driver having an input terminal denoted by IN, and an output terminal denoted by OUT. The input terminal IN of the basic circuit is intended to be coupled to a signal source (not represented). At the output terminal OUT appears a signal which is intended to drive a circuit or transmission line connected to the output terminal OUT.

The basic circuit is a classical feedback loop, but the amplifying element is the cascade of an operational amplifier A and a transformer T. The gain of this cascade equals K. The output signal of the amplifying cascade is divided by a factor β (typically between 2 and 10) and subtracted from the input signal provided by the signal source. The result of this subtraction is used as input for the amplifying cascade.

The gain of the closed feedback loop, being the ratio of the output signal to the input signal provided by the signal source, equals $$\beta \cdot \frac{K}{K+\beta}.$$

In practice K is much higher than β, such that the gain of the closed loop is in good estimation equal to β and insensitive to tolerances on K. The transformer T has a turn ratio 1:n (n>1). As a consequence the required signal range at the output of the operational amplifier A can be n times smaller than the range of the signal that is present at the output terminal OUT.

Figure 2:
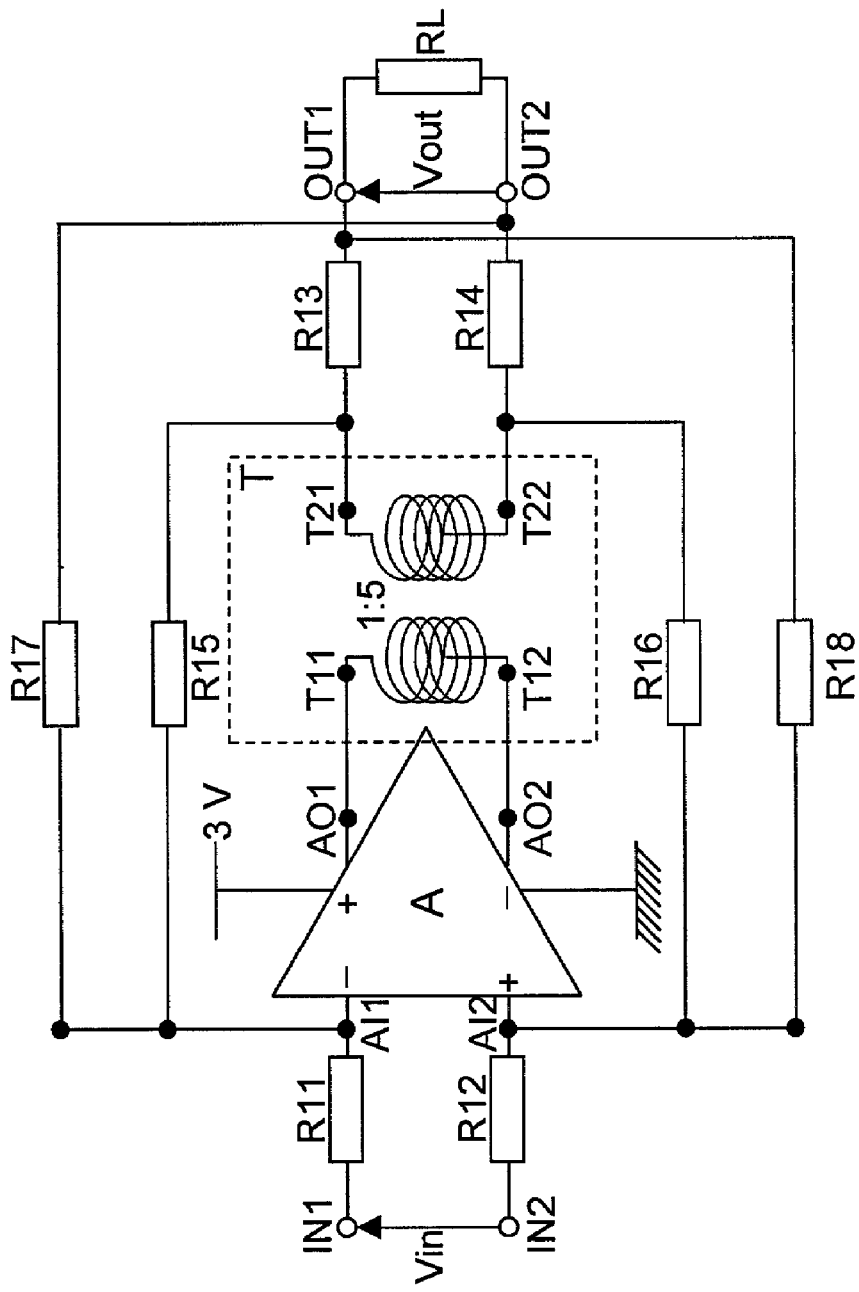
FIG. 2 is a schematic representation of an active back-terminated operational amplifier with a transformer in the feedback loop in accordance with a further embodiment of the present invention.

FIG. 2 illustrates a back-terminated line driver in accordance with a second embodiment of the present invention. It has a first input terminal IN1 and a second input terminal IN2 as well as a first output terminal OUT1 and a second output terminal OUT2. The input terminals IN1, IN2 are intended to be coupled to a first and a second terminal of a signal source. The output terminals OUT1 and OUT2 are intended to be coupled, via transmission lines (not represented), to a load impedance RL. More generally, the transmission line can be supposed to have a characteristic impedance ZL, the resistive part of which equals RL.

The line driver of the present embodiment comprises an amplifying device A. The amplifying device comprises a first and a second device input terminal AI1, AI2 and a first and a second device output terminal AO1, AO2. The first device input terminal AI1 is coupled to the first input terminal IN1 of the line driver over a first resistor R11, and the second device input terminal AI2 is coupled to the second input terminal IN2 of the line driver over a second resistor R12. The device output terminals AO1 and AO2 are connected to a transforming device having a transformation ratio of 1:n whereby n is greater than or equal to 1, e.g. a transformer T. The first device output terminal AO1 is coupled to a first terminal T11 of a primary winding of the transformer T and the second device output terminal AO2 is coupled to a second terminal T12 of the primary windings thereof. A secondary winding of this transformer also has two terminals T21, T22, a first terminal T21 being coupled to the output terminal OUT1, and a second terminal T22 being coupled to OUT2. The transformer T has a turns ratio 1:n (n≧1).

When using a differential output amplifier for delivering maximum power to a load, via transmission lines coupled to the differential output terminals of the amplifier, it is important to match both the impedance of the load and the output impedance of the amplifier, to the line characteristic impedance.

Therefore, the first terminal T21 and the second terminal T22 are coupled to the output terminals OUT1 and OUT2 respectively via a matching impedance, e.g. via a third and a fourth resistor R13, R14, combined with an active back-termination circuit consisting of resistors R17 and R18.

Furthermore, the first and second output terminals T21 and T22 of the transformer T are connected to the respective input AI1 and AI2 of the amplifier A via a feed back impedance. For instance, a fifth resistor R15 is coupled between the first terminal T21 of the secondary winding of the transformer T and the first device input terminal AI1. A sixth resistor R16 is coupled between the second terminal T22 of the secondary winding of the transformer T and the second device input terminal AI2. A seventh resistor R17, forming part of the just mentioned active backtermination, is coupled between the second output terminal OUT2 and the first device input terminal AI1. An eighth transistor R18, also forming part of the just mentioned active backtermination, is coupled between the first output terminal OUT1 and the second device input terminal AI2. Hence, in accordance with this embodiment there is a feed back circuit between the output of the transformed output voltage of the amplifier A and its inputs.

Preferably, the first resistor R11 and second resistor R12 are equal and have a value R1, the third resistor R13 and fourth resistor R14 are equal and have a value (1-α). RL/2 where α represents the active backtermination factor, a factor which is representative for the part of the line impedance that is synthesised by use of the operational amplifier. The fifth resistor R15 and sixth resistor R16 are equal and have a value R1, and the seventh resistor R17 and eighth resistor R18 are equal and have a value R1/α.

In most cases R1 will be much higher than RL. For an RL that can be neglected with respect to R1, the formula of the output impedance of the line driver becomes rather simple:

Zout=RL

Some guideline to select appropriate values for the resistors R11, R12, R13, R14, R15, R16, R17 and R18 can be found in European Patent Application EP 0 901 221 wherein the active back termination concept is described. Anyhow, the presence of the resistors R13, R14, R15, R16, R17 and R18 makes it possible to tune the output impedance Zout of the arrangement to the desired value, i.e. the value to match the load impedance RL. The formula of the output impedance, Zout, on the basis of which the different values of the resistors may be selected for the case where the respective pairs of resistors R13 and R14, R15 and R16, R17 and R18 have substantially identical values, is given by:

$$Zout = \frac{2 \cdot (R13 \cdot R17)}{R13 + R17 - R15}$$

$$= \frac{2 \cdot (1-\alpha) \frac{RL}{2} \frac{R1}{\alpha}}{(1-\alpha) \frac{RL}{2} + \frac{R1}{\alpha} - R1}$$

$$= \frac{2 \cdot (1-\alpha) \cdot RL \cdot R1}{(1-\alpha) \cdot \alpha \cdot RL + 2 \cdot R1 - 2 \cdot \alpha \cdot R1}$$

$$\approx \frac{2 \cdot (1-\alpha) \cdot RL \cdot R1}{2 \cdot R1 - 2 \cdot \alpha \cdot R1} = \frac{2 \cdot (1-\alpha) \cdot RL \cdot R1}{2 \cdot (1-\alpha) \cdot R1} = RL$$

This means indeed that the output impedance of the line driver is matched to the characteristic impedance of the transmission lines if the resistances are chosen as mentioned herein above.

In order to obtain between the first and second output terminals OUT1, OUT2 a voltage of the required voltage level for driving the circuit connected to the transmission lines (e.g. 15 V), it can be seen that the amplifying device A can produce an output signal with a lower voltage level, if n is chosen larger than one. For example for obtaining an output voltage level of 15 V with a transformer with transformation ratio 1:5, the output voltage produced by the amplifying device does not need to exceed 3 V. Thus thanks to a high transformation ratio, a high line driver output voltage can be generated with a low power supply voltage for the operational amplifier. Therefore, the operational amplifier can be integrated on a chip using conventional techniques. The resistor values for active back termination become realisable with sufficient resolution. The active back termination resistive circuit is now located at the side of the transformer with most windings.

While the invention has been shown and described with reference to a preferred embodiment, it will be understood by those skilled in the art that various changes or modifications in form and detail may be made without departing from the scope and spirit of this invention.

What is claimed is:

1. A broadband line driver comprising:

an amplifying device with an input and an output;

a transforming device coupled in series with the output of the amplifying device;

a first input terminal and a second input terminal as well as a first output terminal and a second output terminal;

the amplifying device having a first and a second device input terminal and a first and a second device output terminal;

the transforming device comprising:

a transformer with transformation ratio 1:n, a primary winding with a first terminal and a second terminal, a secondary winding with a first terminal and a second terminal, the first device output terminal being coupled to a first terminal of the primary winding of the transformer, the second device output terminal being coupled to the second terminal of the primary winding, the first terminal of the secondary winding being coupled to the first output terminal, and the second terminal of the secondary winding being coupled to the second output terminal;

a first resistor being connected between the second output terminal and the first device input terminal; and a second resistor being coupled between the first output terminal and the second device input terminal;

wherein the transforming device is located in a feedback loop that couples the output of the amplifying device to the input of the amplifying device.

2. The broadband driver according to claim 1, wherein:

the first device input terminal is coupled to the first input terminal over a third resistor, the second device input terminal is coupled to the second input terminal of the line driver over a fourth resistor, a fifth resistor is connected between the first terminal of the secondary winding of the transformer and the first output terminal, and a sixth resistor is connected between the second terminal of the secondary winding of the transformer and the second output terminal, a seventh resistor is connected between the first terminal of the secondary winding of the transformer and the first device input terminal and a eighth resistor is connected between the second terminal of the secondary winding of the transformer and the second device input terminal.

3. The broadband line driver according to claim 2, wherein the third resistor and the fourth resistor have substantially the same resistance value.

4. The broadband line driver according to claim 2, wherein the fifth resistor and the sixth resistor have substantially the same resistance value.

5. The broadband line driver according to claim 2, wherein the seventh resistor and the eighth resistor have substantially the same resistance value.

6. The broadband line driver according to claim 1, wherein the first resistor and the second resistor have substantially the same resistance value.

* * * * *